United States Patent [19]

Buter et al.

[11] Patent Number: 5,494,980
[45] Date of Patent: Feb. 27, 1996

[54] WATER-DISPERSIBLE HYBRID POLYMER

[75] Inventors: Roelof Buter, HT Dieren; Andreas H. J. Roelofs, HV Arnhem, both of Netherlands

[73] Assignee: Akzo Nobel NV, Arnhem, Netherlands

[21] Appl. No.: 417,719

[22] Filed: Apr. 6, 1995

Related U.S. Application Data

[63] Continuation of Ser. No. 183,541, Jan. 19, 1994, abandoned.

[30] Foreign Application Priority Data

Jan. 21, 1993 [NL] Netherlands .......................... 9300116

[51] Int. Cl.$^6$ .............................. C08L 75/14; C08L 51/08
[52] U.S. Cl. ..................... 525/455; 523/201; 524/457; 524/589; 524/590; 524/591; 525/902
[58] Field of Search ............................ 525/455; 523/201; 524/452, 589, 590, 591

[56] References Cited

U.S. PATENT DOCUMENTS

| | | | |
|---|---|---|---|
| 4,394,491 | 7/1983 | Hoffman | 525/452 |
| 4,584,354 | 4/1986 | Hudecek et al. | 525/454 |
| 4,609,706 | 9/1986 | Bode et al. | 525/7.4 |
| 4,636,545 | 1/1987 | König et al. | 524/457 |
| 4,923,929 | 5/1990 | Ohwada et al. | 525/126 |
| 5,093,412 | 3/1992 | Mente et al. | 524/762 |
| 5,169,719 | 12/1992 | Balatan | 428/423.1 |
| 5,334,420 | 8/1994 | Hartung et al. | 427/407.1 |

FOREIGN PATENT DOCUMENTS

| | | | |
|---|---|---|---|
| 2068122 | 11/1992 | Canada | C09D 175/04 |
| 0385456 | 9/1990 | European Pat. Off. | |
| 0445863 | 9/1990 | European Pat. Off. | |
| 54-039488 | 3/1979 | Japan | |
| 54-036394 | 3/1979 | Japan | |
| 60-132641 | 7/1985 | Japan | |
| 2102214 | 4/1990 | Japan | 525/455 |
| 3143912 | 6/1991 | Japan | |

*Primary Examiner*—Ana L. Carrillo
*Attorney, Agent, or Firm*—Loretta A. Miraglia; Louis A. Morris; James K. Poole

[57] ABSTRACT

A water-dispersible hybrid polymer comprises an ethylenically unsaturated polyurethane (core) onto which an addition polymer chain (shell) has been provided by polymerization, with the unsaturation of the polyurethane being achieved by the incorporation therein of dimethyl-m-isopropenyl benzyl isocyanate, and the acid number of the shell polymer being in the range of 30 to 120 (mg KOH/g). Aqueous dispersions of these hybrid polymers are pre-eminently suitable for use in aqueous coating compositions of the so-called clear coat type, particularly when stringent demands are imposed with regard to the acid resistance of the topcoats applied using these compositions.

19 Claims, No Drawings

5,494,980

WATER-DISPERSIBLE HYBRID POLYMER

This is a continuation of application Ser. No. 08/183,541, filed Jan. 19, 1994, now abandoned.

BACKGROUND OF THE INVENTION

1. Field of the Invention

The invention relates to water-dispersible hybrid polymer comprising an ethylenically unsaturated polyurethane (core) onto which an addition polymer chain (shell) has been provided by polymerization, to an aqueous dispersion incorporating such a polymer, and to the use of such a dispersion in coating compositions.

2. Description of the Prior Art

A water-dispersible hybrid polymer of the aforementioned type is known from WO-A-91/15 528. In WO-A-91/15 528, the ethylenically unsaturated groups in the polyurethane originate from a polyester polyol and/or a polyether polyol and/or a compound which in addition to an ethylenically unsaturated group shows a group reactive toward NCO groups. As examples of suitable ethylenically unsaturated compounds may be mentioned trimethylol propane monoallyl ether, glycerol monoallyl ether, pentaerythritol diallyl ether, and alkenedicarboxylic acids, such as maleic acid and unsaturated dimerized fatty acids. The compositions disclosed in said document are recommended exclusively for use in coating compositions of the so-called base coat type. They were found to be less suitable for use in coating compositions of the so-called clear coat type, particularly when stringent demands are imposed with regard to the acid resistance of topcoats applied using these compositions.

SUMMARY OF THE INVENTION

The current invention now provides a water-dispersible hybrid polymer which is not only suitable for use in the same applications as listed in WO-A-91/15 528, but is also pre-eminently suitable for use in coating compositions of the clear coat type.

In this invention, a water-dispersible hybrid polymer of the known type mentioned in the opening paragraphs the polyurethane unsaturation has been achieved by the incorporation therein of dimethyl-m-isopropenylbenzylisocyanate, and the acid number of the shell polymer is in the range of 30 to 120 (mg KOH/g).

Upon dispersal in an aqueous medium, the hybrid polymers according to the invention were found, after neutralization of at least a portion of the carboxyl groups of the addition polymer chains by a base, to yield a stable dispersion of a comparatively low viscosity, even at a concentration of 40 weight percent and higher and with an average particle size of 100 nm or even less.

The hybrid polymers themselves have a relatively low acid number comparable to the acid number of polymers used in organic solvents. Aqueous dispersions of these hybrid polymers are suited to be used in aqueous coating compositions with a comparatively high solids content. Films obtained with such coating compositions have favorable mechanical and physical properties and were also found to possess good resistance to attack by water, chemicals, and acids. Good resistance to acids was found to be of great importance in the case of use in topcoats of the so-called clear coat type.

DETAILED DESCRIPTION OF THE INVENTION

The hybrid polymer according to the invention preferably is made up of 40–90 weight percent of core and 10–60 weight percent of shell. Within these limits, the hybrid polymer was found to possess the optimum combination of the individual components' advantageous properties. Among the advantageous properties of polyurethanes are favorable mechanical characteristics and good resistance to acids. The good resistance to chemical action and hydrolysis is mainly due to the composition of the shell made up of addition polymers.

The Core

Particularly suitable polymers are hybrid polymers in which the core is composed of a polyurethane prepared from a diol and aliphatic, cycloaliphatic and/or araliphatic diisocyanates. As examples of suitable diisocyanates may be mentioned: tetramethylene-1,4-diisocyanate, hexamethylene-1,6-diisocyanate, cyclohexyl-1,4-diisocyanate, isophorone diisocyanate, dicyclohexyl methane-4,4'-diisocyanate, 1,5-dimethyl-2,4-bis(isocyanatomethyl)benzene, 1,5-dimethyl-2,4-bis-(ω-isocyanatoethyl)benzene, 1,3,5-trimethyl-2,4-bis(isocyanatomethyl)benzene, 1,3,5-triethyl-2,4-bis(isocyanatomethyl)benzene, and dicyclohexyl dimethylmethane-4,4'-diisocyanate.

In general, preference is given to polyurethanes based on non-aromatic diisocyanates, since polyurethanes based on aromatic diisocyanates are subject to discoloration by UV radiation. In coating compositions for topcoats which are not brought into contact with UV radiation, such as fillers and primers, hybrid polymers in which the core is composed of aromatic diisocyanates may be utilized with advantage. Examples of suitable aromatic diisocyanates include toluenediisocyanate and diphenyl-methane-4,4'-diisocyanate.

Linear as well as branched diols with 2–12 carbon atoms are suitable for use. Examples of suitable diols include: ethylene glycol, 1,3-propanediol, 1,6-hexanediol, 1,12-dodecanediol, 3-methyl-1,5-pentanediol, 2,2,4-trimethyl-1,6-hexanediol, 2,2-dimethyl-1,3-propanediol, and 2-methyl-2-cyclohexyl-1,3-propanediol. Also, ester diols may be used. As an example thereof may be mentioned the neopentylglycol ester of hydroxypivalic acid.

In addition, polyester diols may be used, provided they have a low acid number (less than 5 mg KOH/g). They are preferably prepared from aromatic and/or cycloaliphatic dicarboxylic acids or derivatives thereof and the aforementioned diols.

The term derivatives of (cyclo)aliphatic or aromatic dicarboxylic acids refers to the anhydrides or the alkyl esters having alkyl groups of 1–4 carbon atoms thereof. As suitable (cyclo)aliphatic or aromatic dicarboxylic acids or derivatives thereof may be mentioned: tetrahydrophthalic acid, tetrahydrophthalic anhydride, phthalic anhydride, endomethylene tetrahydrophthalic acid, hexahydrophthalic anhydride, hexachloroendomethylene tetrahydrophthalic acid, hexahydrophthalic acid, hexahydroterephthalic acid, phthalic acid, p-carboxymethyl benzene acid, dichlorophthalic acid, tetrachlorophthalic acid, dimethyl terephthalate, dimethyl hexahydroterephthalate, naphthalene-2,6-dicarboxylic acid, and 4,4'-oxydibenzoic acid. Particularly preferred are dicarboxylic acids having 8–10 carbon atoms, e.g. isophthalic acid and terephthalic acid. When the hybrid polymers according to the invention are used in topcoats of the clear coat type, preference is given to (cyclo)aliphatic dicarboxylic acids, since this will improve resistance to ultraviolet radiation.

Favorable results have further been obtained using polyester diols prepared by the conversion of a half ester of the aforementioned diols with a (cyclo)aliphatic or aromatic dicarboxylic anhydride and a monoepoxide such as 1,2-epoxy-octane or, preferably, a glycidyl ester of a carboxylic acid according to formula I below:

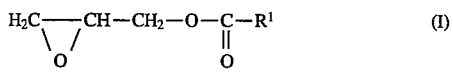  (I)

wherein $R^1$ is an alkyl group having 4–40 carbon atoms.

Optimum results were found to be obtained when the polyurethane is composed of:

a) n moles of diisocyanate, b) n+1 moles of diol having an acid number <5 (mg KOH/g) and a number average molecular weight (Mn) of 70–2000, with n=1–10, and c) 0.05–1.0 mole of dimethyl-m-isopropenylbenzylisocyanate.

Besides diisocyanates, triisocyanates may be used for the preparation of the water-dispersible hybrid polymers according to the present invention. Examples of suitable triisocyanates include: the reaction product of 3 moles of hexamethylene-1,6-diisocyanate and 1 mole of $H_2O$ (marketed by Bayer under the trade designation Desmodur N), the isocyanurate trimer of hexamethylene-1,6-diisocyanate (Desmodur N® 3390 ex Bayer or, Tolonate HDT® ex Rhône-Poulenc), the isocyanurate trimer of isophorone diisocyanate, and the reaction product of 1 mole of trimethylolpropane and 3 moles of isophoronediisocyanate.

For polyurethanes based on triisocyanates, optimum results were found using:

a) 1 mole of triisocyanate, b) 3–3.6 moles of diol having an acid number <5 (mg KOH/g) and a molecular weight (Mn) of 70–2000, with the two hydroxyl groups of the diol exhibiting different reactivities toward isocyanate groups, and c) 0.05–1.0 mole of dimethyl-m-isopropenylbenzylisocyanate.

In order to prevent gelling when employing a triisocyanate, it is important that the diol or polyester diol contains two OH groups which each have a different reactivity toward isocyanate. Examples of diols having OH groups of different reactivities include: 2-ethyl-1,3-hexanediol, 2-methyl-1,3-hexanediol, 2-propyl-1,3-hexanediol, 2-butyl-2-ethyl-1,3-propanediol, as well as the polyester diols prepared from a half ester of a linear or branched diol having 2–12 carbon atoms and 2 primary OH groups and a (cyclo)aliphatic or aromatic dicarboxylic anhydride and a monoepoxide such as 1,2-epoxyoctane or, preferably, a glycidyl ester of a carboxylic acid according to Formula I below:

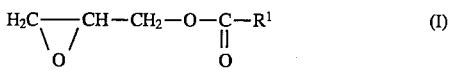  (I)

Wherein $R^1$ is an alkyl group having 4–40 carbon atoms.

To prevent gelling it is of importance that the dimethyl-misopropenylbenzylisocyanate be used in an amount of less than 1 mole per mole of polyurethane. Preference is given in this case to using 0.05–0.6 moles per mole of polyurethane if the polyurethane has been prepared with a disocyanate, and to using 0.05–0.4 moles per mole of polyurethane when the latter has been prepared from a triisocyanate. However, the optimum amount to be used of said ethylenically unsaturated monoisocyanate is also dependent on the monomers to be employed in the preparation of the shell, the initiator, and the use of a chain length regulator, if any.

The polyurethane is prepared in a dry atmosphere at a temperature in the range of 50° to 120° C., preferably in the range of 60° to 100° C. Optionally, use may be made of a catalyst such as an amine or an organometallic (e.g., tin) compound in the conventional amount of 0.01 to 0.1 weight percent. As stabilizer or inhibitor may be employed hydroquinone, hydroquinone monomethyl ether, nitrobenzene or ditertiary-butylphenol in the conventional amount of 50 to 1000 ppm.

The Shell

The hybrid polymer is prepared by addition polymerization of monomers polymerizable under the influence of free radicals in the presence of an ethylenically unsaturated polyurethane described hereinbefore. In this process the addition polymer chains are covalently bonded to the polyurethane by means of copolymerization with the ethylenically unsaturated bond.

The monomers polymerizable under the influence of free radicals for the addition polymer chains may be chosen from a wide range, including ethylenically unsaturated monocarboxylic acids such as (meth)acrylic acid and crotonic acid; (cyclo)alkyl (meth)acrylates having 1–12 carbon atoms in the (cyclo)alkyl group, such as methyl (meth)acrylate, ethyl (meth)acrylate, propyl (meth)acrylate, isopropyl (meth)acrylate, butyl (meth)acrylate, 2-ethylhexyl (meth)acrylate, octyl (meth) acrylate, isobornyl (meth)acrylate, dodecyl (meth)acrylate, and cyclohexyl (meth)acrylate; dicarboxylic acids, such as maleic acid (and anhydride), fumaric acid, itaconic acid (and anhydride); (cyclo)alkyl esters of such dicarboxylic acids having 1–12 carbon atoms in the (cyclo)alkyl group, such as dimethyl maleate, diethyl maleate, diethyl fumarate, dipropyl maleate, dibutyl maleate, dibutyl fumarate, 2-ethylhexyl maleate, 2-ethylhexyl fumarate, octyl maleate, isobornyl maleate, dodecyl maleate, and cyclohexyl maleate; (meth)acrylates with ether groups, such as 2-methoxy-ethyl methacrylate, 2-ethoxyethyl methacrylate, and 3-methoxy-propyl methacrylate; hydroxyalkyl (meth)acrylates, such as 2-hydroxyethyl (meth)acrylate, 2-hydroxypropyl (meth) acrylate, 4-hydroxybutyl acrylate, 6-hydroxyhexyl acrylate, p-hydroxycyclohexyl (meth)acrylate; hydroxypolyethylene glycol (meth)acrylates; hydroxypolypropylene glycol (meth)acrylates and alkoxy derivatives thereof; monovinyl aromatic compounds, such as styrene, vinyltoluene, α-methylstyrene, and vinylnaphthalene; other substituted (meth)acrylate compounds, such as (meth)acrylamide, (meth)acrylonitrile, N-methylol (meth)acrylamide, and N-alkyl(meth)acrylamides; other monounsaturated compounds, such as vinyl chloride, vinyl acetate, vinyl propionate, and vinylpyrrolidone.

For monomer mixtures which are pre-eminently suited to form the addition polymer chains reference is made to EP-B-0 000 601. The equivalent U.S. Pat. No. 4,245,074 is incorporated herein by reference. The following monomer mixture is a specific example from said publication:

25–55 mole percent of styrene and/or α-methylstyrene,

20–40 mole percent of a compound according to formula (2):

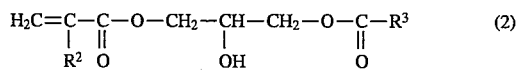  (2)

wherein:

$R^2$ represents a hydrogen atom or a methyl group, and $R^3$ represents an alkyl group having 4–40 carbon atoms, 10–30 mole percent of acrylic acid and/or methacrylic acid, and 0–30 mole percent of some other mono-unsaturated compound as described hereinbefore.

Another specific example of a monomer mixture disclosed in EP-B-0 000 601 is as follows:

25–55 mole percent of styrene and/or α-methylstyrene,

20–50 mole percent of acrylic acid and/or methacrylic acid, and

0–30 mole percent of some other mono-unsaturated compound as described hereinbefore, wherein, during or after polymerization, the reaction product is reacted with such an amount of glycidyl ester of a carboxylic acid according to Formula I as will give an acid number for the obtained shell polymer in the range of 30 to 120 (mg KOH/g).

As stated above, the specific monomers and monomer mixtures should be so chosen as to ensure that the resulting shell polymer has an acid number in the range of 30 to 120 (mg KOH/g). When the acid number is less than 30, it generally proves to be impossible to obtain a stable dispersion, while the water resistance of the dispersion proves unacceptable if the acid number is higher than 120.

Of course, the selection of the monomers and/or monomer mixtures is dependent on various factors, including the final application of the hybrid polymer. In actual practice, it is quite easy for the person of average skill in the art to take these and other factors into account and adjust the monomers' selection in line with the envisaged use.

The copolymerization of the ethylenically unsaturated monomers in the presence of the ethylenically unsaturated polyurethane is generally carried out in an inert atmosphere (e.g. of nitrogen) and in the presence of a radical initiator. The polymerization temperature may range from 60° to 200° C., preferably from 100° to 160° C.

Suitable free radical initiators include: 2,2-azobis-2-methylbutyronitrile, 2,2-azobisisobutyronitrile, dibenzoyl peroxide, dicumyl peroxide, methyl ethyl ketone peroxide, cumene hydroperoxide, tert-butyloxy-2-ethyl hexanoate, tert-butyl perbenzoate, tert-butylcumyl peroxide, di-tert-butyl peroxide, di-tert-butylperoxy-3,5,5-trimethyl cyclohexane, 1,3-bis(tert.butyl)peroxyisopropyl benzene. Mixtures of the above-mentioned initiators are also suitable for use. In general, the radical initiators are employed in an amount of about 0.05 weight percent to about 10 weight percent, preferably of about 1 weight percent to 5 weight percent, based on the overall weight of the monomer mixture.

Optionally, use may also be made of a chain length regulator such as n-octyl mercaptan, dodecyl mercaptan or 3-mercaptopropionic acid.

It is preferred to carry out the polymerization reaction in an organic solvent (10–30 weight percent) at a temperature of 60° to 200° C. The organic solvent used in this reaction should be water-miscible. Suitable examples of such a solvent are glycol ethers and propylene glycol ethers, such as methoxypropanol, butoxyethanol, isopropanol, diethylene glycol monobutyl ether, diethylene glycol monomethyl ether, propoxypropanol, diethylene glycol dimethyl ether, and N-methylpyrrolidone. Alternatively, it is possible to employ small amounts of a water-immiscible organic solvent, e.g., methyl ethyl ketone and methyl isobutyl ketone.

Dispersions of Hybrid Polymers

The invention also relates to aqueous dispersions of the hybrid polymers described hereinbefore. These are readily dispersible in an aqueous medium after at least a portion of the carboxyl groups of the addition polymer chains has been neutralized. The group of suitable neutralization agents for carboxyl groups comprises a wide range of organic and inorganic bases. As examples may be mentioned ammonia, primary, secondary, and tertiary amines, such as ethylamine, propylamine, dimethylamine, dibutylamine, cyclohexylamine, benzylamine, morpholine, piperidine, and triethanolamine. The use of tertiary amines, such as dimethylethanol amine, triethyl amine, tripropyl amine, and tributyl amine, is preferred. The degree of neutralization preferably is 50 to 130 percent on the basis of equivalency.

Following neutralization the hybrid polymers can easily be dispersed in an aqueous medium in a conventional manner, preferably at elevated temperatures in the range of 50° to about 100° C. When hybrid polymers according to the invention are employed, in many cases stable dispersions having a solids content of 40 weight percent and even higher may be obtained.

Coating Compositions of Dispersions of Hybrid Polymers

As was stated earlier, dispersions of hybrid polymers are preeminently suited to be used in coating compositions. When the dispersions of hybrid polymers according to the invention are so utilized, the coating compositions may also contain a curing agent forcuring via the hybrid polymer's hydroxyl groups. Films of coating compositions according to the invention were found to exhibit outstanding physical and mechanical properties, such as flexibility, hardness, and gloss.

As suitable curing agents may be mentioned, in general, N-methylol-and/or N-methylol ether-containing aminoplasts. Favorable results are attained when using methylolmelamine containing 4–6 methylol groups per molecule, with at least three of the methylol groups being esterified with methanol, butanol and/or a methanol or butanol condensation product of formaldehyde and N,N'-ethylene diureum. Other appropriate curing agents include water-dispersible blocked isocyanates, e.g., those blocked with methylethyl ketoxime, and isocyanate group-containing adducts of a polyisocyanate and a hydrocarboxylic acid, e.g. dimethylpropionic acid.

As a rule, the curing agents which react with the hydroxyl groups are employed in such an amount as will give a ratio of the number of hydroxyl groups in the hybrid polymer to the number of reactive groups of the curing agent in the range of 0.7 to 1.5.

Depending on their field of application, the coating compositions may contain a variety of other additives common to the paint industry, such as pigments, coloring agents, pigment dispersing agents, and thixotropic or other rheological agents. If so desired, the coating composition may also contain accelerators for the curing reaction, such as p-toluene sulfonic acids and blocked derivatives thereof.

The coating compositions according to the invention may be applied onto any known substrate such as wood, synthetic materials, and metals. Suitable application methods include rolling, spraying, sprinkling, dipping, and electrostatic spraying. Of course it is also possible to apply the coating composition by simple brushing.

The coating composition may be dried and cured under a variety of conditions, e.g. at room temperature. Accelerated curing may be accomplished by baking at elevated temperatures in the range of 100° to 160° C. over a period of 20 to 60 minutes.

These coating compositions are suitable for use in a wide range of applications. They are especially suitable, however, for use as primers/fillers, and clear and colored paints.

The invention will be further illustrated with reference to a number of non-limiting examples.

EXAMPLES

In the following examples a number of stable aqueous polymer dispersions were prepared in accordance with the invention. Various properties of these dispersions were measured, the results being listed in TABLE 1.

For instance, the average particle size of the dispersion was determined by dynamic light scattering, the dispersions being diluted to a solids content of 0.1 weight percent. The viscosity was determined with a Brookfield viscometer (LV - 4; 60 rpm). The solids content of the dispersions was measured in accordance with ASTM method 1644-59, with heating to 140° C. over a period of 30 minutes.

Preparation of the Dispersions

Polyurethanes having a molecular weight of about 2000 to 4000 of theory were prepared from diol intermediates and a polyisocyanate, with dibutyl tin diacetate (DBTDA) being used as catalyst. The three diol intermediates (intermediates A–C) described below were employed.

Intermediate A

In a 3 l flask fitted with a stirrer, a thermometer, a cooler, and a dropping funnel a mixture was homogenized, the mixture being composed of:

236 g of 1,6-hexanediol
208 g of neopentyl glycol
616 g of cis-hexahydrophthalic anhydride, and
6 g of benzyl triphenyl phosphonium chloride.

The dropping funnel was filled with 1000 g of the glycidyl ester of 1,1-dimethyl-1-heptane carboxylic acid (Cardura E-10®, ex Shell).

After ventilation, the flask and the dropping funnel were brought under a nitrogen atmosphere. The contents of the flask were heated to 120° C. After 1 hour of reaction at this temperature, the contents of the flask were heated to 140° C. The contents of the dropping funnel were added dropwise to the flask over a period of 2 hours. After 4 hours, the reaction mixture had an acid number of 8.5 (mg KOH/g resin). Next, 80 g of Cardura E-10® were added. After 2 hours, the acid number of the reaction mixture was <1 (mg KOH/g resin). The molecular weight of the thus prepared intermediate was 537 of theory.

Intermediate B

In a 3 l flask fitted with a stirrer, a thermometer, a cooler, and a dropping funnel a mixture was homogenized, the mixture being composed of:

265.5 g of 1,6-hexane diol
234.0 g of neopentyl glycol
666.0 g of phthalic anhydride, and
6.8 g of benzyl triphenyl phosphonium chloride.

The dropping funnel was filled with 1125 g of Cardura E-10®.

After ventilation, the flask and the dropping funnel were brought under an atmosphere of nitrogen. The contents of the flask were heated to 136° C. The contents of the dropping funnel were added dropwise to the flask over a period of 1.5 hours. After 3 hours, the reaction mixture had an acid number of 9.7 (mg KOH/g resin). Next, 100 g of Cardura E-10® were added. After 2 hours, the acid number of the reaction mixture was <1 (mg KOH/g resin). The molecular weight of intermediate B was 533 of theory.

Intermediate C

A resin was prepared in a manner analogous to that indicated for product B, except that the molecular weight of the intermediate this time was 520 of theory.

EXAMPLE I

In a 2 l flask fitted with a stirrer, a thermometer, a reflux condenser, and two dropping funnels a mixture was homogenized, the mixture being composed of:

261.6 g of Intermediate A
55.0 g of N-methylpyrrolidone (NMP)
0.1 g of DBTDA.

The first dropping funnel was filled with 72.1 g of isophorone diisocyanate (IPDI), and the second one was filled with 16.3 g of dimethyl-m-isopropenylbenzylisocyanate (m-TMI®) (ex Cyanamid).

Barring air humidity, the contents of the flask were heated to 90° C. After 1 hour, the contents of the first dropping funnel were added dropwise to the flask. After 2 hours of reaction at 90° C., the reaction mixture was heated to 100° C. Over a period of 15 minutes the contents of the second dropping funnel were added dropwise to the flask. The reaction mixture was subsequently kept at this temperature for 1 more hour.

Next, one dropping funnel was replaced with a third dropping funnel filled with a homogeneous mixture of:

38.2 g of styrene,
9.2 g of methyl methacrylate,
33.1 g of acrylic acid,
66 0 g of Cardura E-10®,
2.7 g of dicumyl peroxide,
0.8 g of 3-mercaptopropionic acid, and
51.9 g of 2-butoxyethanol.

After ventilation, the flask and the dropping funnel were brought under an atmosphere of nitrogen. The contents of the flask were heated to 130° C. The contents of the dropping funnel were added dropwise to the flask over a period of 1 hour. The reaction mixture was kept at this temperature for 3 hours. After cooling to 115° C., 18.1 g of N,N-dimethyl ethanolamine were added. After cooling to 90° C., 782 g of demineralized water were added dropwise to the flask over a period of 3 hours, with vigorous stirring of the flask's contents.

EXAMPLE II

In a manner analogous to that indicated in Example I a polymer dispersion was prepared, except that this time use was made of the following ingredients:

286.0 g of Intermediate A
50.0 g of NMP, and
0.1 g of DBTDA.

The first dropping funnel was filled with 59.7 g of hexamethylenediisocyanate (HDI). The second dropping funnel was filled with 14.3 g of m-TMI®. The first reaction was carried out at 80° C. The third dropping funnel was filled this time with a homogeneous mixture of:

30.6 g of styrene,
7.3 g of methyl methacrylate,
26.4 g of acrylic acid,
52.8 g of Cardura E-10®
2.2 g of dicumyl peroxide,
0.7 g of 3-mercaptopropionic acid, and
45.1 g of 1-methoxypropanol-2.

On conclusion of the reaction, 14.5 g of N,N-dimethyl ethanolamine and 711.8 g of demineralized water were added.

EXAMPLE III

In a manner analogous to that indicated in Example I a polymer dispersion was prepared, except that this time the flask was filled with the following ingredients:

283.0 g of intermediate A,
40.0 g of NMP, and
0.1 g of DBTDA.

The first dropping funnel was filled with 66.4 g of HDI. The second dropping funnel was filled with 10.6 g of m-TMI®.

The third dropping funnel was filled with a homogeneous mixture of:

30.6 g of styrene,
7.3 g of methyl methacrylate,
26.4 g of acrylic acid,
52.8 g of Cardura E-10®,
2.2 g of dicumyl peroxide,
0.7 g of 3-mercaptopropionic acid, and
32.0 g of 1-methoxypropanol-2.

On conclusion of the reaction, 14.5 g of N,N-dimethylethanolamine and 604.2 g of demineralized were added.

EXAMPLE IV

In a manner analogous to that indicated in Example I a polymer dispersion was prepared, except that this time the flask was filled with the following ingredients:

281.3 g of Intermediate A,
40.0 g of NMP, and
0.1 g of DBTDA.

The first dropping funnel was filled with 70.3 g of HDI. The second dropping funnel was filled with 8.4 g of m-TMI®.

The third dropping funnel was filled with a homogeneous mixture of:

30.6 g of styrene,
7.3 g of methyl methacrylate,
26.4 g of acrylic acid,
52.8 g of Cardura E-10®,
2.2 g of dicumyl peroxide,
0.7 g of 3-mercaptopropionic acid, and
32.0 g of 1-methoxypropanol-2.

On conclusion of the reaction, 14.5 g of N,N-dimethyl ethanolamine and 604.2 g of demineralized water were added dropwise.

EXAMPLE V

In a manner analogous to that indicated in Example I a polymer dispersion was prepared, except that this time the flask was filled with the following ingredients:

280.7 g of intermediate B,
40.0 g of NMP, and
0.1 g of DBTDA.

The first dropping funnel was filled with 70.8 g of HDI. The second dropping funnel was filled with 8.5 g of m-TMI®.

The third dropping funnel was filled with a homogeneous mixture of:

30.6 g of styrene,
7.3 g of methyl methacrylate,
26.4 g of acrylic acid,
52.8 g of Cardura E-10®,
2.2 g of dicumyl peroxide,
0.7 g of 3-mercaptopropionic acid, and
32.0 g of 1-methoxypropanol-2.

On conclusion of the reaction, 14.5 g of N,N-dimethylethanolamine and 549.8 g of demineralized water were added.

EXAMPLE VI

In a manner analogous to that indicated in Example I a polymer dispersion was prepared, except that this time the flask was filled with the following ingredients:

333.5 g of intermediate C and
0.45 g of DBTDA.

The first dropping funnel was filled with a homogeneous mixture of:

106.7 g of Tolonate HDT® (ex Rhône-Poulenc) (isocyanurate trimer of hexamethylene-1,6-diisocyanate) and
60.0 g of NMP.

The second dropping funnel was filled with 9.8 g of m-TMI®.

Barring air humidity, the contents of the flask were heated to 80° C. The contents of the first dropping funnel were added dropwise to the flask over a period of 1 hour.

After 3 hours of reaction at 80° C., the reaction mixture was heated to 100° C. The contents of the second dropping funnel were added dropwise to the flask in 15 minutes. The reaction mixture was subsequently kept at this temperature for 1 more hour.

Next, one dropping funnel was replaced with a third dropping funnel, which was filled with a homogeneous mixture of:

38.1 g of styrene,
9.2 g of methyl methacrylate,
33.0 g of acrylic acid,
65.9 g of Cardura E-10®,
2.75 g of dicumyl peroxide,
1.10 g of 3-mercaptopropionic acid, and
30.0 g of diethylene glycol monobutyl ether.

Following ventilation, the flask and the dropping funnel were brought under an atmosphere of nitrogen. The contents of the flask were heated to 130° C. Over a period of 1 hour the contents of the dropping funnel were added dropwise to the flask. The reaction mixture was kept at this temperature for 3 hours. After cooling to 115° C., 16.8 g of N,N-dimethylethanolamine were added. After cooling to 90° C., 1006 g of demineralized water were added dropwise over a period of 2 hours.

EXAMPLE VII

In a manner analogous to that indicated in Example VI a polymer dispersion was prepared, except that this time the third dropping funnel was filled with:
- 36.7 g of styrene,
- 11.5 g of 2-hydroxyethyl methacrylate,
- 31.7 g of acrylic acid,
- 66.1 g of Cardura E-10®,
- 2.6 g of dicumyl peroxide,
- 1.3 g of 3-mercaptopropionic acid, and
- 30.0 g of diethylene glycol monobutyl ether.

On conclusion of the reaction, 16.8 g of N,N-dimethyl ethanolamine and 914.8 g of demineralized water were added.

EXAMPLE VIII

In a manner analogous to that indicated in Example VII a polymer dispersion was prepared, except that this time the flask was filled with the following ingredients:
- 335.0 g of Intermediate C, and
- 0.45 g of DBTDA.

The first dropping funnel was filled with a homogeneous mixture of:
- 107.2 g of Tolonate HDT®, and
- 60.0 g of NMP.

The second dropping funnel was filled with 7.8 g of m-TMI®.

On conclusion of the reaction, 16.8 g of N,N-dimethylethanolamine and 793.2 g of demineralized water were added.

EXAMPLE IX

In a manner analogous to that described in Example VII a polymer dispersion was prepared, except that this time the flask was filled with the following ingredients:
- 336.5 g of intermediate C, and
- 0.45 g of DBTDA.

The first dropping funnel was filled with a homogeneous mixture of:
- 107.6 g of Tolonate HDT®, and
- 60.0 g of NMP.

The second dropping funnel was filled with 5.9 g of m-TMI®.

On conclusion of the reaction, 16.8 g of N,N-dimethylethanolamine and 721.8 g of demineralized water were added.

EXAMPLE X

In a manner analogous to that indicated in Example VII a polymer dispersion was prepared, except that this time the flask was filled with the following ingredients:
- 337.9 g of Intermediate C, and
- 0.45 g of DBTDA.

The first dropping funnel was filled with a homogeneous mixture of:
- 108.1 g of Tolonate HDT®, and
- 60.0 g of NMP.

The second dropping funnel was filled with 3.9 g of m-TMI®.

On conclusion of the reaction, 16.8 g of N,N-dimethylethanolamine and 612.0 g of demineralized water were added.

EXAMPLE XI

In a manner analogous to that indicated in Example VII a polymer dispersion was prepared, except that this time the flask was filled with the following ingredients:
- 339.2 g of Intermediate A, and
- 0.45 g of DBTDA.

The first dropping funnel was filled with a homogeneous mixture of:
- 105.1 g of Tolonate HDT®, and
- 60.0 g of NMP.

The second dropping funnel was filled with 5.7 g of m-TMI®.

On conclusion of the reaction, 16.8 g of N,N-dimethylethanolamine and 721.8 g of demineralized water were added.

EXAMPLE XII

In a 2 l flask fitted with a stirrer, a thermometer, a reflux condenser, and two dropping funnels a mixture was homogenized, the mixture comprised of:
- 190. g of 2-ethyl-1,3-hexanediol, and
- 0.45 g of DBTDA.

The first dropping funnel was filled with a homogeneous mixture of:
- 238.3 g of Tolonate HDT® and
- 60. g of NMP.

The second dropping funnel was filled with 21.8 g of dimethyl-m-isopropenyl benzyl isocyanate (m-TMI®).

Barring air humidity, the contents of the flask were heated to 70° C. The contents of the first dropping funnel were added dropwise to the flask over a period of 1 hour, the contents of the flask being kept at 70° C. After 3 hours of reaction at 70° C., the reaction mixture was heated to 100° C., after which the contents of the second dropping funnel were added dropwise to the flask in 15 minutes. The reaction mixture was subsequently kept at 100° C. for 1 more hour.

Next, one dropping funnel was replaced with a third dropping funnel which was filled with a homogeneous mixture of:
- 37.5 g of styrene,
- 11.45 g of methyl methacrylate,
- 32.95 g of acrylic acid,
- 65.80 g of Cardura E-10®,
- 2.75 g of dicumyl peroxide,
- 1.35 g of 3-mercaptopropionic acid, and
- 30.00 g of diethylene glycol monobutyl ether.

After ventilation, the flask and the dropping funnel were brought under an atmosphere or nitrogen, after which the contents of the flask were heated to 130° C. The contents of the dropping funnel were added dropwise to the flask in 1 hour, the contents of the flask being kept at 130° C. The reaction mixture was kept at this temperature for 3 hours. After cooling to 115° C., 18.5 g of N,N-dimethylethanolamine were added. After cooling to 90° C., 830 g of demineralized water were added dropwise over a period of 2 hours, with vigorous stirring of the flask's contents.

EXAMPLE XIII

In a manner analogous to that indicated in Example XII a polymer dispersion was prepared, except that this time the third dropping funnel was filled with a homogeneous mixture of:

34.3 g of styrene,
14.3 g of 2-hydroxyethyl methacrylate,
31.6 g of acrylic acid,
65.9 g of Cardura E-10®,
2.6 g of dicumyl peroxide,
1.3 g of 3-mercaptopropionic acid, and
30.0 g of diethylene glycol monobutyl ether.
On conclusion of the reaction, 16.8 g of N,N-dimethylethanolamine and 793 g of demineralized water were added.

EXAMPLE XIV

In a manner analogous to that indicated in Example XIII a polymer dispersion was prepared, except that this time the second dropping funnel was filled with 17.6 g of m-TMI®.

On conclusion of the reaction 16.8 g of N,N-dimethylethanolamine and 756 g of demineralized water were added.

The properties of the polymer dispersions prepared as specified in the examples above are listed in TABLE 1 below.

TABLE I

| Dispersion of Example | Solids content (wt. %) | Viscosity (pa.s.) | pH | average particle size (mm) |
|---|---|---|---|---|
| I | 35.8 | 1.1 | 8.6 | 71 |
| II | 36.0 | 0.4 | 8.6 | 81 |
| III | 40.3 | 0.9 | 8.6 | 71 |
| IV | 40.4 | 0.7 | 8.5 | 70 |
| V | 43.1 | 0.5 | 8.6 | 78 |
| VI | 33.8 | 0.6 | 8.6 | 156 |
| VII | 36.2 | 1.2 | 8.4 | 125 |
| VIII | 39.3 | 1.2 | 8.5 | 112 |
| IX | 41.9 | 0.5 | 8.5 | 64 |
| X | 43.8 | 1.0 | 8.3 | 83 |
| XI | 41.0 | 0.4 | 8.4 | 67 |
| XII | 38.1 | 0.5 | 8.5 | 99 |
| XIII | 39.5 | 2.5 | 8.5 | 66 |
| XIV | 40.2 | 0.6 | 8.5 | 67 |

Preparation of Coating Compositions

Examples XV–XXXV below cover the preparation of a number of unpigmented coating compositions according to the invention by mixing the dispersion, a melamine hardener, and demineralized water, if desired. The melamine hardeners used in these examples were Cymel 303® and Cymel 327® ex Cyanamid. When Cymel 303® was used, p-toluene sulfonic acid blocked with diethanolamine was employed as catalyst. The demineralized water was added to adjust the viscosity to a spraying viscosity of 0.1 Pa.s. (run-out viscosity of 30 s. in a Ford Cup No. 4). The solids contents of these coating compositions are determined in the same way as that of the dispersions. The results are given in TABLE 2.

TABLE 2

| Example | Disp. of Ex: - | Disp. (g) | Cymel 327® (g) | Cymel 303® (g) | p-TSZ (g) | solids content (wt. %) |
|---|---|---|---|---|---|---|
| XV | I | 70 | 30 | — | — | 39.7 |
| XVI | I | 80 | — | 20 | 0.3 | 35.7 |
| XVII | II | 70 | 30 | — | — | 41.8 |
| XVIII | III | 70 | 30 | — | — | 45.0 |
| XIX | IV | 70 | 30 | — | — | 45.9 |

TABLE 2-continued

| Example | Disp. of Ex: - | Disp. (g) | Cymel 327® (g) | Cymel 303® (g) | p-TSZ (g) | solids content (wt. %) |
|---|---|---|---|---|---|---|
| XX | V | 70 | 30 | — | — | 46.3 |
| XXI | VI | 70 | 30 | — | — | 37.2 |
| XXII | VI | 80 | — | 20 | 0.3 | 39.2 |
| XXIII | VII | 75 | 25 | — | — | 38.7 |
| XXIV | VIII | 75 | 25 | — | — | 40.7 |
| XXV | IX | 75 | 25 | — | — | 42.7 |
| XXVI | IX | 75 | — | 25 | 0.25 | 41.0 |
| XXVII | X | 75 | 25 | — | — | 44.2 |
| XXVIII | X | 75 | — | 25 | 0.25 | 44.3 |
| XXIX | XI | 75 | 25 | — | — | 42.2 |
| XXX | XI | 70 | 30 | — | — | 42.6 |
| XXXI | XII | 75 | 25 | — | — | 40.2 |
| XXXII | XIII | 75 | 25 | — | — | 40.8 |
| XXXIII | XIII | 80 | — | 20 | 0.3 | 38.5 |
| XXXIV | XIV | 75 | 25 | — | — | 42.3 |
| XXXV | XIV | 75 | — | 25 | 0.25 | 39.3 |

Each of the coating compositions was applied onto a steel panel (Bonder 132) pre-treated with zinc phosphate and cured for 30 minutes in a baking oven of 140° C. in the case of Cymel 327® being used, and of 130° C. when Cymel 303® was employed. Various properties of the thus obtained coating compositions were measured, and the results are listed in TABLE 3. The Persoz hardness was determined in accordance with French Industrial Standard NF T30-016, with the result being expressed in seconds. An acceptable minimum for automotive paints is about 180 seconds. The flexibility of the coating compositions was determined with the ball impact test in accordance with ASTM D2794-69, using a ball weight of 0.908 kg, a ball diameter of 15.9 mm, and an aperture of 16.3 mm. The results are expressed in kg.cm. An acceptable minimum flexibility is 35 kg.cm for the coated side, the maximum measurable value being 85 kg.cm.

In addition, the Erichsen indentation test was performed. The results are expressed in mm. A value $\geq 6$ indicates that the tested coat is flexible, while a value of 2 indicates that it is brittle.

The gloss of the coating composition was determined in accordance with ASTM D-523 at 60° and 20°. A gloss value on a steel substrate $\geq 80$ measured at 60° is considered high.

TABLE 3 properties of the Topcoats Applied Using the Coating Compositions

| Coating composition of example | Layer thickness (μm) | Persoz hardn. sec | Flexibility (kg · cm) C[1] | Erichsen indentation (mm) u[2] | Gloss 60° | Gloss 20° |
|---|---|---|---|---|---|---|
| XV | 40 | 312 | 22 <2 | 6.6 | 92 | 76 |
| XVI | 42 | 271 | 46 2 | 8.4 | 94 | 80 |
| XVII | 40 | 202 | 85 83 | 8.6 | 92 | 76 |
| XVIII | 39 | 202 | 66 >85 | 7.7 | 92 | 76 |
| XIX | 40 | 223 | >85 >85 | 7.8 | 92 | 77 |
| XX | 40 | 235 | 78 85 | 7.4 | 92 | 77 |
| XXI | 41 | 301 | 58 46 | 7.3 | 94 | 74 |
| XXII | 41 | 194 | >85 >85 | 8.6 | 94 | 76 |
| XXIII | 41 | 251 | >85 >85 | 7.5 | 94 | 74 |
| XXIV | 41 | 234 | 85 >85 | 7.9 | 98 | 80 |
| XXV | 40 | 237 | >85 >85 | 7.6 | 96 | 80 |
| XXVI | 45 | 326 | 25 5 | 7.0 | 95 | 70 |

TABLE 3-continued properties of the Topcoats Applied
Using the Coating Compositions

| Coating composition of example | Layer thickness (μm) | Persoz hardn. sec | Flexibility (kg · cm) C[1] | Erichsen indentation (mm) u[2] | Gloss 60° | Gloss 20° |
| --- | --- | --- | --- | --- | --- | --- |
| XXVII | 42 | 210 | 80 | >80 | 7.7 | 95 | 79 |
| XXVIII | 40 | 325 | 28 | 5 | 7.7 | 94 | 67 |
| XXIX | 41 | 161 | >85 | >85 | 7.5 | 95 | 80 |
| XXX | 39 | 225 | 68 | 64 | 7.4 | 94 | 79 |
| XXXI | 41 | 299 | 56 | 20 | 7.8 | 95 | 77 |
| XXXII | 41 | 286 | 46 | 34 | 7.5 | 95 | 77 |
| XXXIII | 42 | 302 | 28 | 5 | 7.0 | 95 | 77 |
| XXXIV | 40 | 289 | 44 | 28 | 7.6 | 96 | 79 |
| XXXV | 42 | 309 | 32 | 7 | 7.0 | 95 | 78 |

1. Coated side
2. Uncoated side

The results of TABLE 3 show that the hybrid polymers according to the invention can be used to prepare coating compositions which upon application onto a substrate will yield topcoats exhibiting favorable properties, such as high hardness, high flexibility, and high gloss.

Acid Resistance

To determine resistance to acids, several unpigmented coating compositions were applied onto aluminum test panels and cured as indicated hereinbefore.

After curing, the topcoats all had a layer thickness of about 40 μm. To carry out the test, 5 drops each of a 38 weight percent and a 52 weight percent $H_2SO_4$ solution, respectively, were applied to the panel to be tested, which was then visually assessed for any attack after 4, 8, and 16 hours. The results of this assessment are given on a scale of 0 to 10. On this scale 10 indicates that the panel has not been subject to any attack at all, while 0 stands for serious damage.

10 : no damage

7–9: clearly visible stain

4–6: clouding of the film

0–3: cracked and damaged film

The results of the measurements are given in TABLE 4 below. Topcoats of several commercially available, organic solvent-containing coating compositions have been incorporated into the testing program as references. Ref. 1 is composed of:

70 weight percent of acrylate based on:

32.5 weight percent of 2-hydroxyethyl acrylate 28.0 weight percent of styrene 18.5 weight percent of butyl acrylate 21.0 weight percent of butyl methacrylate (Mn=3000), and 30 weight percent of hexamethoxymethylmelamine (Cymel 303®) (acid catalyzed)

Ref. 2 is composed of:

70 weight percent of acrylate based on:

33.5 weight percent of 2-hydroxypropylmethacrylate 20.0 weight percent of butyl methacrylate 13.0 weight percent of styrene 1.5 weight percent of methacrylic acid 32.0 weight percent of butyl acrylate (Mn=3000), and 30 weight percent of hexamethoxymethylmelamine (Cymel 303®) (acid catalyzed)

Ref. 3 is composed of:

70 weight percent of Ref. 1 acrylate and 30 weight percent Cymel 327®

Ref. 4 is composed of:

70 weight percent of Ref. 2 acrylate and 30 weight percent Cymel 327®

TABLE 4

| Coating composition of Example | Assessment of acid resistance | | | | | |
| --- | --- | --- | --- | --- | --- | --- |
| | 38 wt. % $H_2SO_4$ | | | 52 wt. % $H_2SO_4$ | | |
| | 4 hr | 8 hr | 16 hr | 4 hr | 8 hr | 16 hr |
| XVIII | 10 | 9 | 7 | 8 | 2 | 0 |
| XIX | 10 | 8 | 5 | 9 | 5 | 2 |
| XX | 10 | 10 | 10 | 10 | 8 | 5 |
| XXI | 10 | 10 | 10 | 10 | 10 | 10 |
| XXII | 10 | 10 | 10 | 10 | 10 | 10 |
| XXIII | 10 | 10 | 10 | 10 | 10 | 10 |
| XXIV | 10 | 10 | 10 | 10 | 10 | 10 |
| XXV | 10 | 10 | 10 | 10 | 10 | 10 |
| XXVI | 10 | 10 | 10 | 10 | 10 | 10 |
| XXVII | 10 | 10 | 10 | 10 | 10 | 10 |
| XXVIII | 10 | 10 | 10 | 10 | 10 | 10 |
| XXIX | 10 | 10 | 10 | 10 | 10 | 10 |
| XXX | 10 | 10 | 10 | 10 | 10 | 10 |
| XXXI | 10 | 10 | 10 | 10 | 10 | 10 |
| XXXII | 10 | 10 | 10 | 10 | 10 | 10 |
| XXXIII | 10 | 10 | 10 | 10 | 10 | 10 |
| XXXIV | 10 | 10 | 10 | 10 | 10 | 10 |
| XXXV | 10 | 10 | 9 | 10 | 8 | 5 |
| Ref. 1 | 10 | 5 | 3 | 8 | 3 | 0 |
| Ref. 2 | 10 | 5 | 3 | 7 | 2 | 0 |
| Ref. 3 | 10 | 5 | 2 | 7 | 2 | 0 |
| Ref. 4 | 10 | 4 | 1 | 7 | 2 | 0 |

The test results listed in TABLE 4 clearly show that the topcoats obtained with the coating compositions according to the present invention invariably contrast surprisingly favorably with the topcoats obtained with the reference samples. It can also be concluded from the test results in the above table that the coating compositions based on Examples XXI to XXXIV, all of which were prepared from a triisocyanate based polyurethane, generally generate the best results.

We claim:

1. A water-dispersible hybrid polymer comprising an ethylenically unsaturated polyurethane (core) onto which an addition polymer chain (shell) has been covalently bonded by means of copolymerization with the ethylenically unsaturated bond of the polyurethane, wherein the unsaturation of the polyurethane has been achieved by the incorporation therein of dimethyl-m-isopropenylbenzylisocyanate, and the acid number of the shell polymer is in the range of 30 to 120 (mg/KOH/g).

2. The water-dispersible hybrid polymer according to claim 1, wherein the polymer is made up of 40–90 weight percent of core and 10–60 weight percent of shell.

3. The water-dispersible hybrid polymer according to claim 1, wherein the polyurethane is composed of:

a) n moles of diisocyanate, b) n+1 moles of diol having an acid number <5 (mg KOH/g) and a number average molecular weight (Mn) of 70–2000, with n=1–10, and c) 0.05–1.0 mole of dimethyl-m-isopropenylbenzylisocyanate.

4. The water-dispersible hybrid polymer according to claim 1, wherein the polyurethane is composed of:

a) about 1 mole of triisocyanate, b) about 3–3.6 moles of diol having an acid number <5 (mg KOH/g) and a molecular weight (Mn) of 70–2000, with the two hydroxyl groups of the diol exhibiting different reactivities toward isocyanate groups, and c) about 0.05–1.0 mole of dimethyl-m-isopropenylbenzylisocyanate.

5. The water-dispersible hybrid polymer according to claim 3, wherein the diol is 2-ethyl-1,3-hexanediol.

6. The water-dispersible hybrid polymer according to claim 3, wherein the diol is the reaction product of a half ester of a diol having 2 primary OH groups and 2–12 carbon atoms and a (cyclo)aliphatic or aromatic dicarboxylic anhydride and a monoepoxide.

7. The water-dispersible hybrid polymer according to claim 6 wherein said monoepoxide is 1,2-epoxyoctane.

8. The water-dispersible hybrid polymer according to claim 6 wherein said monoepoxide is a glycidyl ester of a carboxylic acid according to the formula:

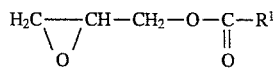

wherein $R^1$ represents an alkyl group having 4–40 carbon atoms.

9. The water-dispersible hybrid polymer according to claim 4 wherein the diol is 2-ethyl-1,3-hexanediol.

10. The water-dispersible hybrid polymer according to claim 4 wherein the diol is the reaction product of a half ester of a diol having 2 primary OH groups and 2–12 carbon atoms and a (cyclo)aliphatic or aromatic dicarboxylic anhydride and a monoepoxide.

11. The water-dispersible hybrid polymer according to claim 10 wherein said monoepoxide is 1,2-epoxyoctane.

12. The water-dispersible hybrid polymer according to claim 10 wherein said monoepoxide is a glycidyl ester of a carboxylic acid according to the formula:

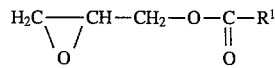

wherein $R^1$ represents an alkyl group having 4–40 carbon atoms.

13. The water-dispersible hybrid polymer according to claim 1, wherein the polymer of the shell is composed of:

25–55 mole percent of styrene and/or α-methylstyrene,

20–50 mole percent of acrylic acid and/or methacrylic acid, and

0–30 mole percent of some other mono-unsaturated compound, followed by conversion with such an amount of glycidyl ester of a carboxylic acid of the formula:

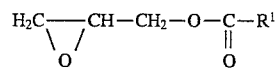

as will give an acid number for the shell polymer in the range of 30 to 120 (rag KOH/g).

14. The water-dispersible hybrid polymer according to claim 1, wherein at least a portion of the shell polymer is neutralized with a base.

15. The water-dispersible hybrid polymer according to claim 1, wherein the polymer of the shell is formed by addition polymerization of monomers polymerizable under the influence of free radicals, said monomers being selected from the group consisting of ethylenically unsaturated monocarboxylic acids; (cyclo)alkyl (meth)acrylates having from 1 to 12 carbon atoms in the (cyclo)alkyl group; dicarboxylic acids; (cyclo)alkyl esters of dicarboxylic acids having from 1 to 12 carbon atoms in the (cyclo)alkyl group; (meth)acrylates containing ether groups; hydroxyalkyl (meth)acrylates; hydroxypolyethylene glycol (meth)acrylates; hydroxypolypropylene glycol (meth)acrylates and alkoxy derivatives thereof; monovinyl aromatic compounds; (meth)acrylamide; (meth)acrylonitrile; N-methylol (meth)acrylamide; N-alkyl(meth)acrylamides; vinyl chloride; vinyl acetate; vinyl propionate; and vinylpyrrolidone.

16. An aqueous dispersion comprising the water-dispersible hybrid polymer according to claim 14.

17. A coating composition comprising the aqueous dispersion according to claim 16.

18. A coating composition according to claim 17 wherein the coating composition is unpigmented.

19. A coating composition according to claim 17 wherein the coating composition is a topcoat.

* * * * *